3,360,499
POLYALKYLENE OXIDES STABILIZED WITH AN AMINE AND AN ALIPHATIC THIOETHER
Otto Mauz, Frankfurt am Main, and Claus Heuck, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Feb. 3, 1965, Ser. No. 430,166
Claims priority, application Germany, Feb. 6, 1964, F 41,931
1 Claim. (Cl. 260—45.8)

ABSTRACT OF THE DISCLOSURE

Polyalkylene oxides stabilized with a mixture of an amine and an aliphatic thioether.

---

The present invention relates to stabilized polyalkylene oxides and a process for preparing them.

It is known that homo- and copolymers of alkylene oxides, like all polyethers, are liable to degradation reactions to a greater or smaller extent at raised temperatures and under the action of oxygen and light and, therefore, must be stabilized prior to being processed or used.

It has already been proposed to use as stabilizers, for example for polypropylene oxide, aromatic amines or phenols. However, stabilizers of this type are little effective, especially when the polymers are processed above 100° C. and they do not inhibit degradation at higher temperatures—for example at 110° C.

It has now been found that a mixture of (a) at least one known amine stabilizer and
(b) at least one aliphatic thioether of the general formula

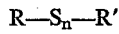

R—$S_n$—R′ in which $n$ stands for a whole number in the range of from 1 to 4, R and R′ represent an alkyl radical with 8–20 carbon atoms or the group —$(CH_2)_m$—$COOR_1$, in the latter group $m$ being a whole number in the range of from 1 to 4 and $R_1$ an alkylene radical with 8–20 carbon atoms, is excellently suitable for stabilizing polyalkylene oxides. The aforesaid radicals R and R′ may be identical or different. The mixing ratio of components $a$ and $b$ is preferably in the range of from 1:5 to 5:1 parts by weight.

As known amine stabilizers there are mentioned by way of example: aliphatic amines substituted by aromatic radicals such as N,N-diphenyl-ethylene diamine, heterocyclic amines such as phenothiazine; and aromatic amines. It is particularly advantageous to use aromatic amines having 12–30 carbon atoms and 1–3 nitrogen atoms in the molecule, for example phenyl-β-naphthylamine, 4,4′-diamino-diphenylamine, N,N-diphenyl-ethylene diamine, N-cyclohexyl-N′-phenyl-p-phenylene diamine, N,N′-dicyclohexyl-p-phenylene diamine, N,N′-diisopropyl-p-phenylene diamine, N,N′-dioctyl-p-phenylene diamine and N,N′-didodecyl-p-phenylene diamine.

As organic sulphur compounds enter into consideration, for example:

Di(dodecyl)sulfide, di(octadecyl)sulfide, di(dodecyl)disulfide, di(octadecyl)disulfide, di(dodecyl)trisulfide, di(octadecyl)trisulfide, di(dodecyl)tetrasulfide, di(octadecyl)tetrasulfide, thio-diglycolic acid dodecyl ester, thiodipropionic acid octadecyl ester, thiodibutyric acid dodecyl ester, dithiodiacetic acid dodecyl ester, dithiodipropionic acid dodecyl ester, trisulfide(diacetic acid octadecyl ester), tetrasulfide(diacetic acid octadecyl ester) and the like.

In order to obtain a good stabilizing effect the aforesaid stabilizer mixtures are preferably used in an amount of 0.3–3%, calculated on the weight of the polyalkylene oxide and intimately mixed with the polyalkylene oxide. Of course, mixtures of polymers may be stabilized, too. The stabilizer mixtures are added in solid form or in the form of a solution, advantageously during processing of the polymerization product directly after having carried out the polymerization process. It is likewise possible, however, to add the stabilizers to the solid polymer after processing. Mixing is preferably performed with the exclusion of air by rolling on a multiple roller mill as used, for example, in rubber industries or in a suitable kneader or extruder.

Polymers that can be stabilized by the process of the invention are homo- and copolymers of alkylene oxides. The homo- and copolymers are produced by polymerizing saturated alkylene oxides, such as for example, ethylene oxide, propylene oxide and isobutylene oxide, furthermore substituted epoxides such as, for example, epichlorohydrin, perfluoro-propylene oxide and 1-chloro-3,4-epoxybutane; cycloaliphatic epoxides such as cyclohexene oxide; epoxy ethers such as methyl- and phenylglycidyl ethers; or by copolymerization of unsaturated with saturated epoxides such as, for example, allylglycidyl ether, o-allylphenylglycidyl ether, glycidyl acrylate, vinylcyclohexene monoepoxide, cyclohexene oxide, butadiene monoxide, and 1,2-epoxycyclooctene-(5), in the presence of known ionic catalysts. Especially good results are obtained with the copolymerization of saturated and unsaturated alkylene oxides when the stabilization is carried out before they have been cross-linked, that is to say directly after polymerization. The stabilized polymers thus obtained are of crystalline, amorphous or rubber-like consistency. To test the compounds used according to the invention as to their stabilizing effect the following method was applied:

The stabilizer dissolved in benzene was added to a benzenic solution of the polyalkylene oxide or the copolymer. The solution was thoroughly mixed and a film was prepared by evaporating the benzene. The film was heat-treated at 110° C. in a drying cabinet with the access of air. At intervals of 24 hours samples were taken, a 0.1% benzenic solution was prepared and the reduced specific viscosity was determined at 25° C. The reduction of the reduced specific viscosity is a measurement of the oxidative degradation of the polymer.

The following examples serve to illustrate the invention but they are not intended to limit it thereto.

The examples are summarized in the form of a table and illustrate the effectiveness of the stabilizers to be used according to the invention. The stabilizer effect was determined with a copolymer of propylene oxide and 1,2-epoxy-cyclooctene-(5) and a copolymer of propylene oxide and allylglycidyl ether. The films were heat-treated at 110° C. Example 1 in Table 1 shows the behavior of the unstabilized copolymers while Examples 2–10 and 21–25 of Tables 1 and 3 demonstrate the stabilizing effect of the individual components of the mixtures to be used according to the invention. Examples 11–20 of Tables 2 and 3 show the stabilizing effect of the mixtures to be used.

A comparison of Example 2 (Table 1) with Examples 12, 13 and 14 (Table 2) shows that the measuring data of the reduced specific viscosity of the mixtures with identical concentration are higher than the values of the reduced specific viscosity of the individual components. Moreover, the mixtures have a considerably prolonged stabilizing effect as compared with the individual components. The same phenomena can be observed with the copolymer of propylene oxide and allylglycidyl ether (Table 3).

Hence, it follows that with the combination of the two components an unexpected and very pronounced synergistic effect occurs.

amine, N,N'-dioctyl-p-phenylene diamine and N,N'-didodecyl-p-phenylene diamine and (b) an aliphatic thioether of the formula $$R-S_n-R'$$

in which $n$ stands for a whole number in the range from 1 to 4 R and R' represent a member selected from the group consisting of an alkyl radical with 8 to 20 carbon atoms and the group $-(CH_2)_m-COOR_1$, in said group $m$ being a whole number in the range of 1 to 4 and $R_1$ being an alkyl radical with 8 to 20 carbon atoms, components (a) and (b) being contained in the mixture within the range of 1:5 to 5:1 parts by weight.

TABLE 1

| No. | Stabilizers | Stabilizer concentration in percent by weight | Initial value, ηred | After 1 day, ηred | After 2 days, ηred | After 3 days, ηred | After 6 days, ηred | After 12 days, ηred | After 18 days, ηred | After 22 days, ηred |
|---|---|---|---|---|---|---|---|---|---|---|
| 1 | Without stabilizer | | 16.1 | 0 | | | | | | |
| 2 | Phenyl-β-naphthylamine | 1 | 15.8 | 11.5 | 10.1 | 8.9 | 6.9 | 4.6 | 3.3 | 1.1 |
| 3 | N-phenyl-N-cyclohexyl-p-phenylene diamine | 1 | 15.9 | 11.0 | 8.6 | 7.2 | 5.2 | 3.0 | 1.3 | |
| 4 | N,N'-di-β-naphthyl-p-phenylene diamine | 1 | 15.8 | 11.3 | 9.8 | 7.6 | 5.6 | 3.2 | 2.1 | 1.3 |
| 5 | Di(octadecyl) sulfide | 1 | 16.0 | 3.3 | 0.1 | | | | | |
| 6 | Di(octadecyl) disulfide | 1 | 15.7 | 5.2 | 1.6 | | | | | |
| 7 | Di(octadecyl) trisulfide | 1 | 16.1 | 5.6 | 0.7 | | | | | |
| 8 | Di(octadecyl) tetrasulfide | 1 | 15.9 | 7.2 | 2.1 | | | | | |
| 9 | Trisulfide (diacetic acid octadecyl ester) | 1 | 15.7 | 7.1 | 3.8 | | | | | |
| 10 | Thio-dipropionic acid dodecyl ester | 1 | 15.9 | 7.2 | 2.5 | | | | | |

TABLE 2

| No. | Stabilizers | Stabilizer concentration in percent by weight | Initial value, η red | After 1 day, η red | After 2 days, η red | After 3 days, η red | After 6 days, η red | After 12 days, η red | After 18 days, η red | After 22 days, η red | After 25 days, η red | After 28 days, η red |
|---|---|---|---|---|---|---|---|---|---|---|---|---|
| 11 | Phenyl-β-naphthylamine / Di(octadecyl)sulfide | 0.5 / 0.5 | 15.7 | 12.0 | 10.5 | 9.1 | 7.1 | 5.2 | 4.1 | 3.2 | 2.1 | |
| 12 | Phenyl-β-naphthylamine / Di(octadecyl)disulfide | 0.5 / 0.5 | 16.0 | 12.3 | 10.7 | 10.5 | 10.0 | 5.7 | 4.7 | 3.0 | 2.9 | 1.2 |
| 13 | Phenyl-β-naphthylamine / Di(octadecyl)trisulfide | 0.5 / 0.5 | 15.8 | 12.5 | 10.5 | 10.3 | 10.0 | 7.6 | 5.8 | 4.6 | 3.1 | 1.5 |
| 14 | Phenyl-β-naphthylamine / Di(octadecyl)tetrasulfide | 0.5 / 0.5 | 16.1 | 12.2 | 11.2 | 10.9 | 10.2 | 7.3 | 5.6 | 4.7 | 3.3 | 1.5 |
| 15 | N-phenyl-N-cyclohexyl-p-phenylendiamine / Trisulfide (diacetic acid octadecyl ester) | 0.5 / 0.5 | 16.0 | 12.3 | 11.5 | 10.5 | 10.0 | 6.9 | 5.3 | 4.1 | 3.3 | 1.3 |
| 16 | N,N'-di-β-naphthyl-p-phenylene diamine / Thio-dipropionic acid dodecyl ester | 0.5 / 0.5 | 15.8 | 12.0 | 11.1 | 10.1 | 9.8 | 5.9 | 4.9 | 3.7 | 2.9 | 0.9 |

TABLE 3

| No. | Stabilizers | Stabilizer concentration in percent by weight | Initial value, η red | After 1 day, η red | After 2 days, η red | After 3 days, η red | After 4 days, η red | After 10 days, η red | After 18 days, η red | After 22 days, η red | After 25 days, η red | After 30 days, η red |
|---|---|---|---|---|---|---|---|---|---|---|---|---|
| 17 | N,N'-didodecyl-p-phenylenediamine / Di(octadecyl)disulfide | 0.5 / 0.5 | 14.2 | 11.9 | 11.1 | 10.0 | 9.7 | 7.2 | 5.2 | 4.5 | 3.2 | 0.8 |
| 18 | N,N'-didodecyl-p-phenylene diamine / Di(octadecyl)trisulfide | 0.5 / 0.5 | 14.7 | 12.3 | 11.7 | 10.5 | 10.2 | 7.9 | 6.5 | 5.1 | 3.7 | 1.2 |
| 19 | N,N'-didodecyl-p-phenylenediamine / Di(octadecyl)tetrasulfide | 0.5 / 0.5 | 14.5 | 12.5 | 11.9 | 11.2 | 10.8 | 8.2 | 7.0 | 5.3 | 3.9 | 1.6 |
| 20 | N,N'-didodecyl-p-phenylenediamine / Thio-dipropionic acid dodecyl ester | 0.5 / 0.5 | 14.5 | 11.6 | 11.2 | 9.6 | 9.2 | 6.8 | 4.5 | 3.0 | 1.2 | 0.5 |
| 21 | N,N'-didodecyl-p-phenyldiamine | 1.0 | 14.4 | 11.0 | 10.3 | 8.2 | 7.0 | 5.0 | 3.1 | 2.8 | | |
| 22 | Di(octadecyl)disulfide | 1.0 | 14.6 | 5.1 | 3.6 | 1.7 | 0.4 | | | | | |
| 23 | Di(octadecyl)trisulfide | 1.0 | 14.5 | 5.9 | 3.9 | 1.7 | 0.6 | | | | | |
| 24 | Di(octadecyl)tetrasulfide | 1.0 | 14.6 | 6.8 | 5.0 | 2.8 | 1.1 | | | | | |
| 25 | Thio-dipropionic acid dodecyl ester | 1.0 | 14.3 | 5.1 | 3.4 | 1.4 | 0.2 | | | | | |

We claim:

A composition of matter comprising a polyalkylene oxide and 0.3–3% calculated on the weight of the polyalkylene oxide of a mixture comprising (a) an amine selected from the group consisting of N,N-diphenyl-ethylene diamine, phenothiazine, N,N'-di-β-naphthyl-p-phenylene amine, phenyl-β-naphthylamine, 4,4'-diamino-diphenylamine, N,N-diphenyl-ethylene diamine, N-cyclohexyl-N'-phenyl-p-phenylene diamine, N,N'-dicyclohexyl-p-phenylene diamine, N,N'-diisopropyl-p-phenylene di-

References Cited

UNITED STATES PATENTS 2,920,059  1/1960  MacDonald et al. ____ 260—45.9
3,133,896  5/1964  Dolce et al. _____ 260—45.85
3,277,044  10/1966  Weissermel et al. ____ 260—45.8

DONALD E. CZAJA, *Primary Examiner.*

V. P. HOKE, *Assistant Examiner.*